April 17, 1951 E. W. RAU 2,549,237
COVER FOR POULTRY DRINKING TROUGHS
Filed March 10, 1947
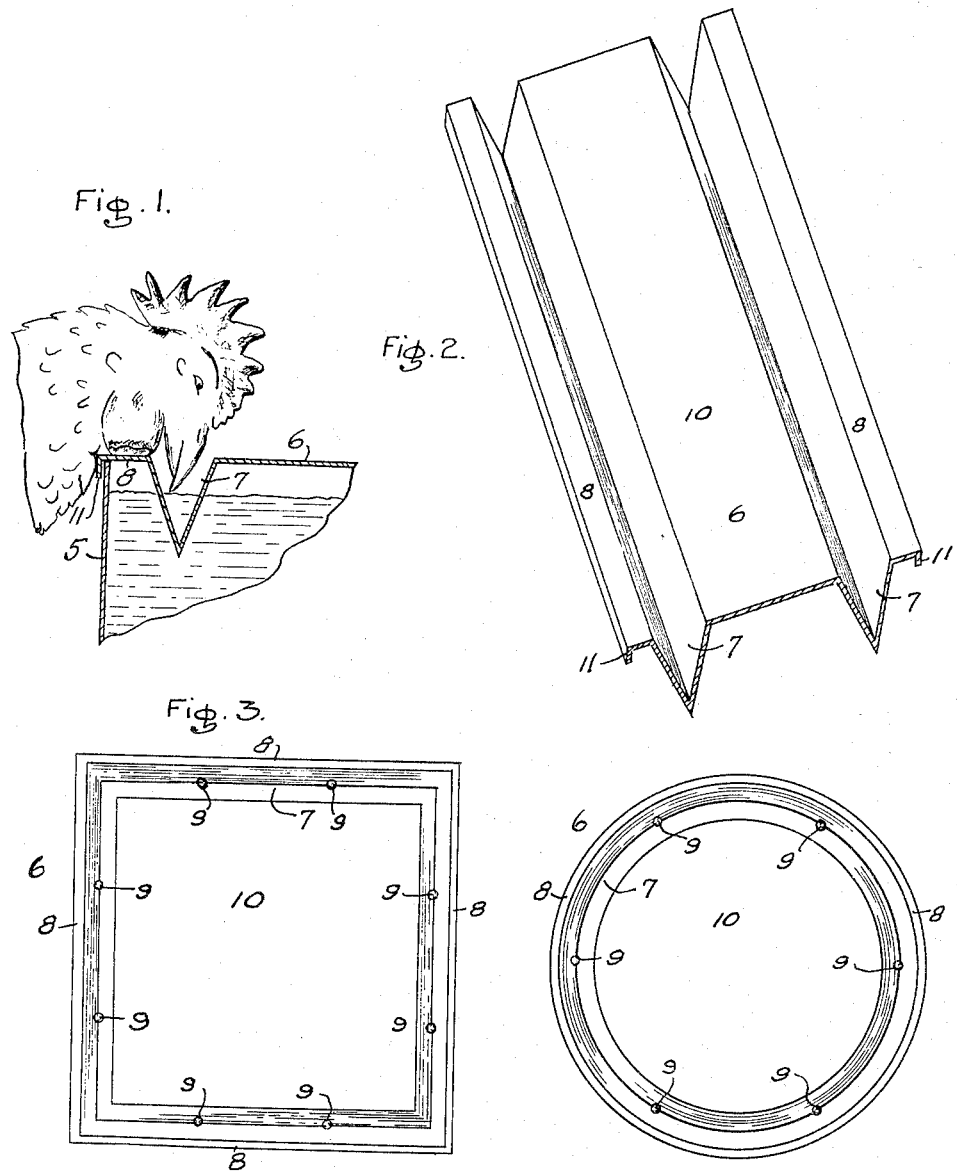
INVENTOR.
Earl W. Rau
BY Patented Apr. 17, 1951

2,549,237

UNITED STATES PATENT OFFICE 2,549,237

COVER FOR POULTRY DRINKING TROUGHS

Earl W. Rau, Tacoma, Wash.

Application March 10, 1947, Serial No. 733,515

2 Claims. (Cl. 119—74)

This invention relates to means of watering a flock of fowls and has special reference to means to keep their wattles dry so that they will not wet the ground at the drinking trough by shaking off the drops of water from their wet wattles after drinking.

I attain this main object by inventing a cover for the watering tank which will permit the fowls to drink but will prevent their wetting their wattles; which will present a relatively narrow area of water exposed for drinking; which is readily removed from the tank for cleansing; and which is inexpensive to make and market and is very effective in use.

I attain these and other objects by the devices and arrangements illustrated in the accompanying drawings, in which—

Fig. 1 is a section of a part of a tank and one form of its cover, illustrating its use by a fowl;

Fig. 2 is a perspective view of the preferred form of such a cover; and Figs. 3 and 4 are plan views of covers for different forms of tanks.

Similar numerals of reference refer to similar parts throughout the several views.

One of the difficulties in the raising of chickens, whether for food or for eggs, is found in the fact that they habitually wet the floor about the watering trough. This fact requires time and labor by the attendant to keep the ground dry.

I have discovered that a chicken in drinking from an open trough stretches out its neck and thus allows its wattles to dip into the water, then it raises its head to swallow and shakes the wattles, thus spraying drops of water over a considerable area near the tank. To overcome this difficulty and to keep the feet of the chicken dry, I have devised the following described invention.

The tank 5 is kept full of water and may be of any desired size and shape, though I prefer a tank about six feet long and from six to twelve inches in width in order that any chicken in the flock may drink in comfort without interference from other chickens in the flock. I provide a metal cover 6 of corresponding size and shape, overlying the water in the tank and, in the preferred form, I form depressions or troughs 7 which are deep enough to dip below the surface of the water so that a sufficient depth of water lies therein for the use of the fowls. These troughs 7 must, of course, be wide enough for use by the fowls and must be positioned near but removed from the edge of the tank, leaving a shelf 8 between the trough and the tank edge on which the wattles will rest while the fowls are drinking.

In the case of the cover 6 of a long tank (Fig. 2) the cover is slightly shorter than the tank and the ends of the troughs 7 are open, thus permitting the water to enter the trough at the ends, but in round, square or other shaped tanks, in which the trough 7 is continuous around the edge of the tank, I provide opening 9 to supply the required water to the troughs. In some cases the trough need not have any continuous bottom at all and may consist merely of a hole in the cover as the essential feature of my invention is that there be a shelf 8 on which the wattles will rest while the fowl is drinking.

Also, the width of the trough 7 must not be so great that the chicken will stretch its neck so far that the wattles will hang down into the water in the trough. The central portion 10 of the cover 6 is always above the level of the water, thus forcing the fowl to drink from the trough alone. Suitable down-turned flanges 11 fit over the edges of the tank 5 and prevent the cover 6 from being laterally displaced by the chickens or by accident, while the ends of the V-shaped troughs 7 dip down into the water and prevent its longitudinal displacement.

It is, of course, understood that many changes may be made in the details of my invention without departing from the spirit thereof as outlined in the appended claims.

What I claim and desire to secure by Letters Patent, is:

1. A removable cover for a drinking water tank for a flock of fowls, comprising an elongated sheet of metal having down-turned marginal flanges adapted to fit over the tank, said sheet being slightly shorter than the tank; said sheet having therein integral elongated down-turned troughs extending from end to end of the sheet and dipping down into the water in the tank.

2. A device as described in claim 1, wherein said down-turned troughs are positioned a spaced distance inwardly from the edges of the cover, thereby providing a dry support area on the cover for supporting the wattles of fowls drinking from the tank.

EARL W. RAU.

REFERENCES CITED

The following references are of record in the file of this patent:

UNITED STATES PATENTS

| Number | Name | Date |
|---|---|---|
| 708,361 | Kelley et al. | Sept. 2, 1902 |
| 807,197 | O'Brien | Dec. 12, 1905 |
| 968,613 | Van Ostrand | Aug. 30, 1910 |
| 1,022,668 | Felker | Apr. 9, 1912 |
| 1,224,043 | Thompson | Apr. 24, 1917 |
| 1,332,554 | Hoffner | Mar. 2, 1920 |
| 1,488,086 | Zieglowsky | Mar. 25, 1924 |
| 1,798,208 | Kratzer | Mar. 31, 1931 |

FOREIGN PATENTS

| Number | Country | Date |
|---|---|---|
| 23,815 | Great Britain | A. D. 1908 |